(12) United States Patent
Aikawa et al.

(10) Patent No.: US 8,642,920 B2
(45) Date of Patent: Feb. 4, 2014

(54) WAFER DIVIDING APPARATUS AND LASER PROCESSING APPARATUS

(75) Inventors: Chikara Aikawa, Ota-Ku (JP); Jun Abatake, Ota-ku (JP); Yasuyoshi Yubira, Ota-ku (JP); Hiroto Yoshida, Ota-ku (JP)

(73) Assignee: Disco Corporation, Tokyo (JP)

( * ) Notice: Subject to any disclaimer, the term of this patent is extended or adjusted under 35 U.S.C. 154(b) by 459 days.

(21) Appl. No.: 12/968,733

(22) Filed: Dec. 15, 2010

(65) Prior Publication Data

US 2011/0147349 A1 Jun. 23, 2011

(30) Foreign Application Priority Data

Dec. 18, 2009 (JP) .................................. 2009-287362

(51) Int. Cl.
*B23K 26/16* (2006.01)
*H01L 21/00* (2006.01)

(52) U.S. Cl.
USPC ..................................... 219/121.67; 438/460

(58) Field of Classification Search
USPC ............... 219/121.6, 121.67, 121.68, 121.82; 438/459, 460–463

See application file for complete search history.

(56) References Cited

U.S. PATENT DOCUMENTS

| 3,433,982 | A | * | 3/1969 | Kaname et al. | 310/357 |
| 5,444,326 | A | * | 8/1995 | Yoshida | 310/359 |
| 7,115,482 | B2 | * | 10/2006 | Maki et al. | 438/459 |
| 7,179,724 | B2 | * | 2/2007 | Nagasawa et al. | 438/463 |
| 2008/0003708 | A1 | * | 1/2008 | Hoshino et al. | 438/33 |

FOREIGN PATENT DOCUMENTS

| JP | 3408805 | 3/2003 |
| JP | 2005-129607 | 5/2005 |
| JP | 2006-040988 | 2/2006 |

* cited by examiner

*Primary Examiner* — Sang Y Paik
(74) *Attorney, Agent, or Firm* — Greer Burns & Crain, Ltd.

(57) ABSTRACT

A wafer dividing apparatus for dividing a wafer along a plurality of crossing streets in the condition where the wafer is attached to the upper surface of a dicing tape supported to an annular frame and the strength of the wafer is reduced along the streets. The wafer dividing apparatus includes a frame holding unit for holding the annular frame, a wafer holding table having a holding surface for holding the wafer through the dicing tape supported to the annular frame held by the frame holding unit, a tape expanding unit for relatively moving the frame holding unit and the wafer holding table in a direction perpendicular to the holding surface of the wafer holding table to thereby expand the dicing tape, and a vibration generating unit for applying vibration to the holding surface of the wafer holding table.

10 Claims, 8 Drawing Sheets

WAFER DIVIDING APPARATUS AND LASER PROCESSING APPARATUS

BACKGROUND OF THE INVENTION

1. Field of the Invention

The present invention relates to a wafer dividing apparatus for dividing a wafer along a plurality of crossing streets formed on the wafer in the condition where the strength of the wafer is reduced along the streets, and relates also to a laser processing apparatus including this wafer dividing apparatus.

2. Description of the Related Art

In a semiconductor device fabrication process, a plurality of crossing division lines called streets are formed on the front side of a substantially disk-shaped semiconductor wafer to thereby partition a plurality of regions where devices such as ICs and LSIs are respectively formed. The semiconductor wafer is cut along the streets to thereby divide the regions where the devices are formed from each other, thus obtaining the individual devices. Further, an optical device wafer is formed by laminating gallium nitride compound semiconductors or the like on a sapphire substrate or a silicon carbide substrate. The optical device wafer is also cut along the streets to obtain individual optical devices divided from each other, such as light emitting diodes and laser diodes, which are widely used in electric equipment.

Cutting of such a wafer including a semiconductor wafer and an optical device wafer along the streets is usually performed by using a cutting apparatus called a dicing saw. This cutting apparatus includes a chuck table for holding a workpiece such as a semiconductor wafer and an optical device wafer, cutting means for cutting the workpiece held on the chuck table, and feeding means for relatively moving the chuck table and the cutting means. The cutting means includes a rotating spindle, a cutting blade mounted on the rotating spindle, and a driving mechanism for rotationally driving the rotating spindle. The cutting blade is composed of a disk-shaped base and an annular cutting edge mounted on a side surface of the base along the outer circumference thereof. The cutting edge is formed by fixing diamond abrasive grains having a grain size of about 3 μm to the base by electroforming so that the thickness of the cutting edge becomes about 20 μm, for example.

However, the sapphire substrate and the silicon carbide substrate mentioned above have high Mohs hardness, so that cutting by the cutting blade is not always easy. Further, since the cutting blade has a thickness of about 20 μm, each street partitioning the devices must have a width of about 50 μm. As a result, the ratio in area of the streets to the wafer is increased, causing a reduction in productivity.

As a method of dividing a wafer along the streets, a laser processing method using a pulsed laser beam having a transmission wavelength to the wafer has been proposed. In this laser processing method, the pulsed laser beam is applied to the wafer along the streets in the condition where a focal point of the pulsed laser beam is set inside the wafer, thereby continuously forming a modified layer inside the wafer along each street as a break start point. Thereafter, an external force is applied to the wafer along each street where the modified layer is formed as the break start point to reduce the strength, thereby breaking the wafer along each street (see Japanese Patent No. 3408805, for example).

As a method of applying an external force to the wafer along each street where the modified layer is formed, thereby dividing the wafer into the individual devices, Japanese Patent Laid-open No. 2005-129607 discloses a method of expanding the dicing tape attached to the wafer to apply a tensile force to the wafer, thereby dividing the wafer into the individual devices.

However, this method of expanding the dicing tape attached to the wafer to apply a tensile force to the wafer has the following problem. When the dicing tape attached to the wafer is expanded, the tensile force is radially applied to the wafer, and this tensile force is accordingly applied to the crossing streets in random directions. As a result, the wafer may be divided irregularly and an undivided area may be left.

To solve this problem, Japanese Patent Laid-open No. 2006-40988 discloses a wafer dividing apparatus which can accurately and reliably divide a wafer along each street where the strength of the wafer is reduced. This wafer dividing apparatus includes a first suction holding member and a second suction holding member for holding the wafer through the dicing tape under suction in the condition where each street is interposed between the first and second suction holding members. In this condition, the first and second suction holding members are moved in opposite directions to thereby apply a tensile force to the wafer in a direction perpendicular to each street. As a result, the wafer can be divided along each street accurately and reliably.

SUMMARY OF THE INVENTION

Thus, the wafer dividing apparatus disclosed in Japanese Patent Laid-open No. 2006-40988 can divide the wafer along each street accurately and reliably. However, the dividing step must be performed along each street where the strength of the wafer is reduced, causing a reduction in productivity.

It is therefore an object of the present invention to provide a wafer dividing apparatus which can accurately, reliably, and efficiently divide a wafer along a plurality of streets where the strength of the wafer is reduced. It is another object of the present invention to provide a laser processing apparatus including this wafer dividing apparatus.

In accordance with an aspect of the present invention, there is provided a wafer dividing apparatus for dividing a wafer along a plurality of crossing streets in the condition where the wafer is attached to the upper surface of a dicing tape supported to an annular frame and the strength of the wafer is reduced along the streets, the wafer dividing apparatus including frame holding means for holding the annular frame; a wafer holding table having a holding surface for holding the wafer through the dicing tape supported to the annular frame held by the frame holding means; tape expanding means for relatively moving the frame holding means and the wafer holding table in a direction perpendicular to the holding surface of the wafer holding table to thereby expand the dicing tape; and vibration generating means for applying vibration to the holding surface of the wafer holding table.

In accordance with another aspect of the present invention, there is provided a laser processing apparatus including wafer holding means for holding a wafer attached to the upper surface of a dicing tape supported to an annular frame; laser beam applying means for applying a laser beam to the wafer held by the wafer holding means; feeding means for relatively moving the wafer holding means and the laser beam applying means in a feeding direction; and indexing means for relatively moving the wafer holding means and the laser beam applying means in an indexing direction perpendicular to the feeding direction; the wafer holding means including frame holding means for holding the annular frame, a wafer holding table having a holding surface for holding the wafer through the dicing tape supported to the annular frame held by the frame holding means, tape expanding means for relatively moving the frame holding means and the wafer holding table in a direction perpendicular to the holding surface of the wafer holding table to thereby expand the dicing tape, and vibration generating means for applying vibration to the holding surface of the wafer holding table.

With the arrangement of the wafer dividing apparatus according to the present invention, the vibration generating means is operated to vibrate the wafer holding table, thereby applying vibration to the wafer while expanding the dicing tape attached to the wafer reduced in strength along the streets. Accordingly, the wafer can be divided along the streets accurately, reliably, and efficiently.

With the arrangement of the laser processing apparatus according to the present invention, the wafer holding means in the laser processing apparatus is substantially the same in configuration as the wafer dividing apparatus mentioned above. Accordingly, a modified layer forming step of forming a plurality of modified layers in the wafer along the plural streets and a wafer dividing step of dividing the wafer into individual devices along the plural streets where the modified layers are formed as applying vibration to the wafer can be performed in the condition where the wafer is held by the wafer holding means in the laser processing apparatus.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

Figure 5:
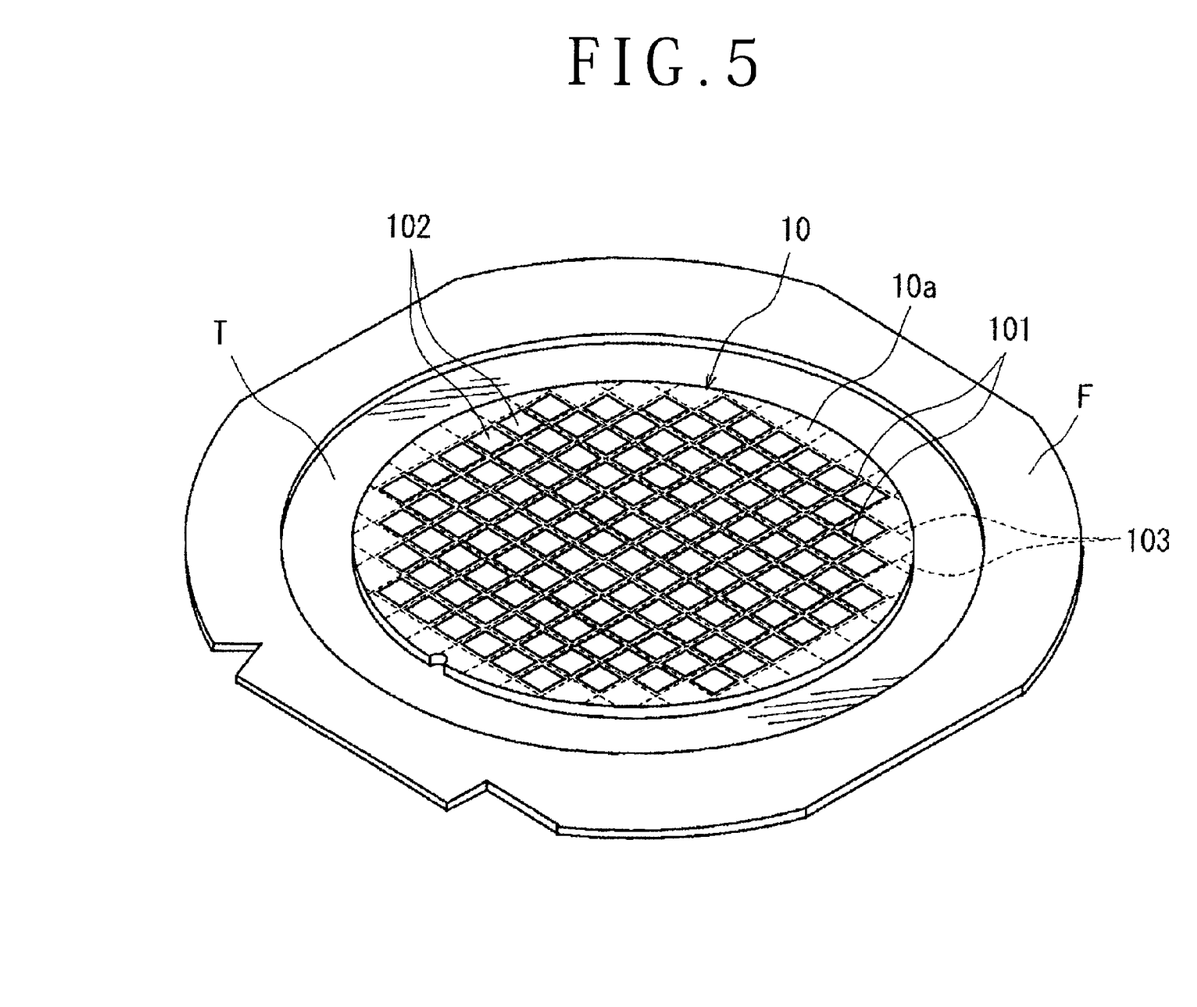
FIG. 5 is a perspective view of a wafer attached to a dicing tape supported to an annular frame, wherein the strength of the wafer is reduced along a plurality of crossing streets formed on the wafer.

A preferred embodiment of the wafer dividing apparatus and the laser processing apparatus according to the present invention will now be described in detail with reference to the attached drawings. FIG. 5 shows a wafer 10 attached to the upper surface of a dicing tape T supported to an annular frame F. The wafer 10 has a front side 10a, and a plurality of crossing streets 101 are formed on the front side 10a of the wafer 10 to thereby partition a plurality of rectangular regions where a plurality of devices 102 are respectively formed. Further, a modified layer 103 as a break start point is continuously formed inside the wafer 10 along each street 101 by applying a pulsed laser beam having a transmission wavelength to the wafer 10 along each street 101 in the condition where the focal point of the pulsed laser beam is set inside the wafer 10. The modified layer 103 may be formed by a laser processing method disclosed in Japanese Patent No. 3408805 mentioned above.

Figure 1:
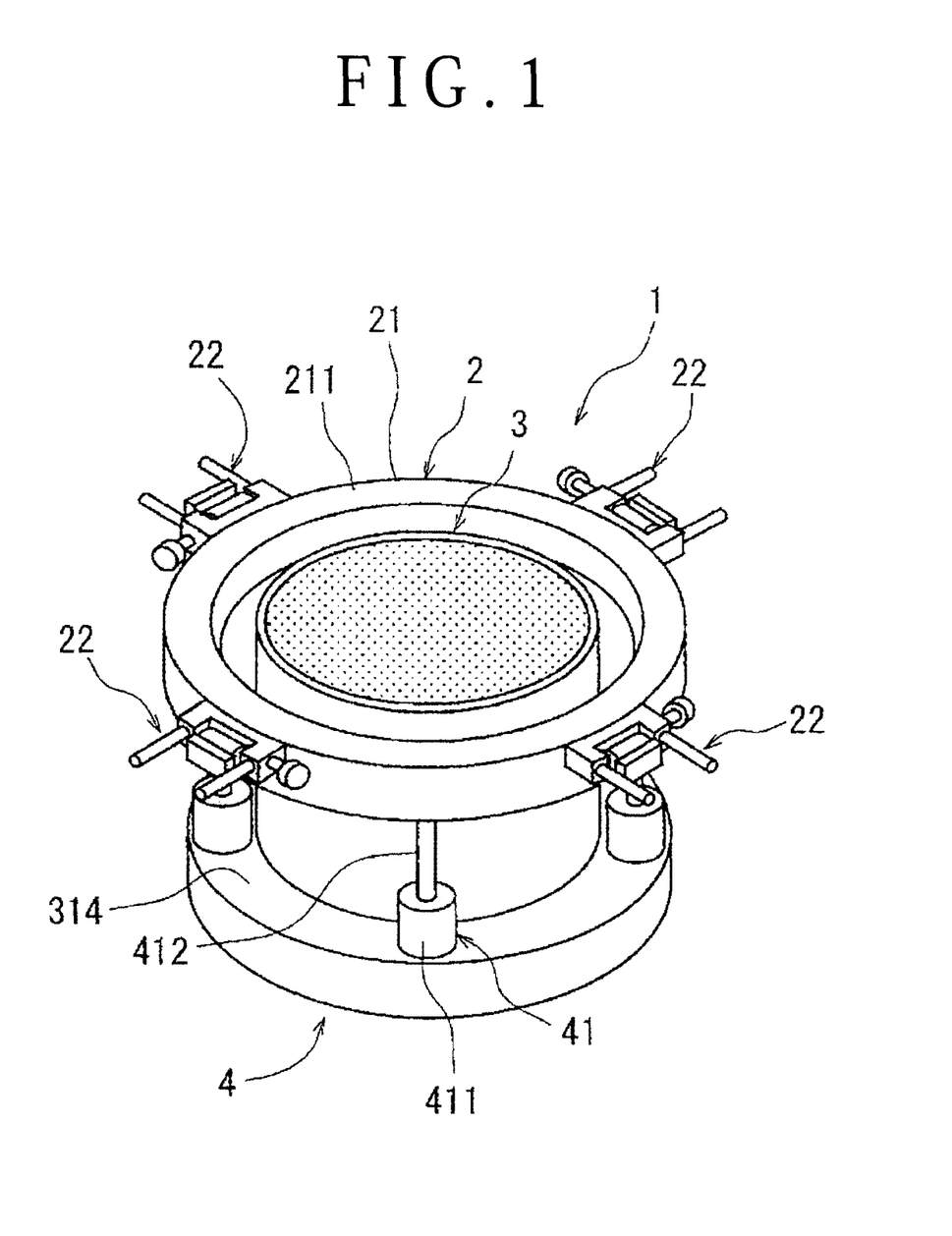
FIG. 1 is a perspective view of a wafer dividing apparatus according to the present invention.
Figure 2:
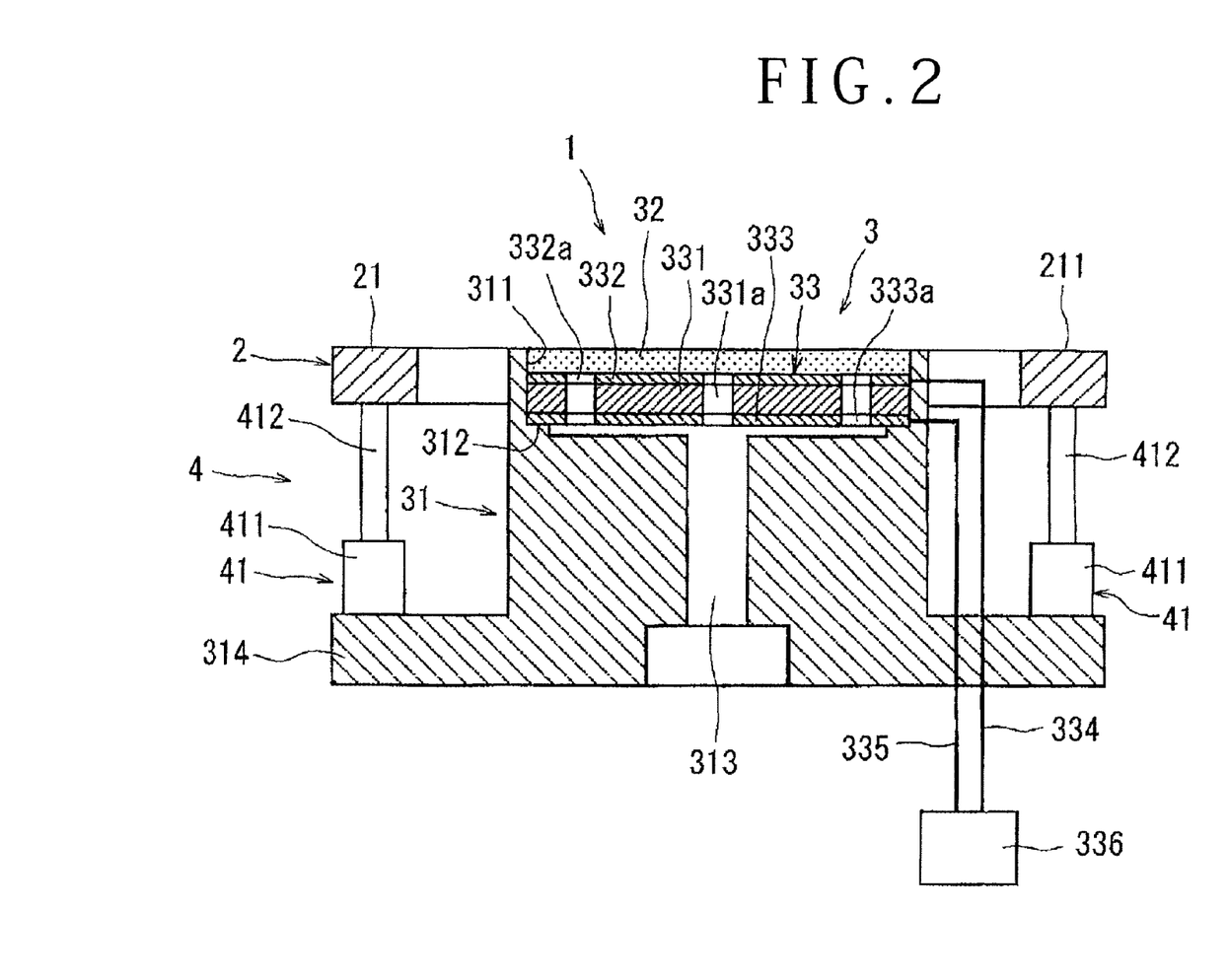
FIG. 2 is a sectional view of the wafer dividing apparatus shown in FIG. 1.

A wafer dividing apparatus for dividing the wafer 10 along the streets 101 will now be described with reference to FIGS. 1 to 3. FIG. 1 is a perspective view of such a wafer dividing apparatus 1 according to the present invention and FIG. 2 is a sectional view of the wafer dividing apparatus 1 shown in FIG. 1. The wafer dividing apparatus 1 includes frame holding means 2 for holding the annular frame F, a wafer holding table 3 having a holding surface for holding the wafer 10 through the dicing tape T supported to the annular frame F held by the frame holding means 2, and tape expanding means 4 for relatively moving the frame holding means 2 and the wafer holding table 3 in a direction perpendicular to the holding surface of the wafer holding table 3 to thereby expand the dicing tape T. The frame holding means 2 includes an annular frame holding member 21 and a plurality of clamp mechanisms 22 as fixing means provided on the outer circumference of the frame holding member 21. The upper surface of the frame holding member 21 functions as a mounting surface 211 for mounting the annular frame F thereon. The annular frame F mounted on the mounting surface 211 is fixed to the frame holding member 21 by the clamp mechanisms 22. The frame holding means 2 is supported by the tape expanding means 4 so as to be vertically movable.

As shown in FIG. 2, the wafer holding table 3 includes a cylindrical body 31, a wafer holding member 32 provided on the upper surface of the cylindrical body 31, the wafer holding member 32 having air permeability, and vibration generating means 33 for applying vibration to the upper surface of the wafer holding member 32 as the holding surface. The body 31 is formed of metal such as stainless steel, and it has an outer diameter smaller than the inner diameter of the annular frame F and larger than the outer diameter of the wafer 10 attached to the dicing tape T supported to the annular frame F. The body 31 is provided radially inside of the annular frame holding member 21. A circular engaging recess 311 is formed on the upper surface of the body 31 of the wafer holding table 3. The outer circumferential portion of the bottom surface of the circular engaging recess 311 is formed with an annular shoulder portion 312 for mounting the vibration generating means 33. The body 31 is further formed with a passage 313 opening to the engaging recess 311. The passage 313 is connected to suction means (not shown). Accordingly, by operating this suction means, a vacuum is produced in the engaging recess 311 through the passage 313. The body 31 of the wafer holding table 3 has a supporting flange 314 projecting radially outward from the lower end of the body 31.

The wafer holding member 32 is a circular member formed of porous ceramics, and it is engaged with the engaging recess 311 of the body 31. The upper surface of the wafer holding member 32 functions as the holding surface for holding the wafer 10. As shown in FIGS. 2 and 3, the vibration generating means 33 includes a circular vibrator 331 and a pair of circular electrode plates 332 and 333 mounted on the opposite polarized surfaces of the vibrator 331. The vibrator 331 is formed of piezoelectric ceramics such as barium titanate, lead titanate zirconate, and lithium tantalate. The electrode plates 332 and 333 are connected through conductors 334 and 335 to AC power supplying means 336. The vibrator 331 and the electrode plates 332 and 333 are formed with a plurality of through holes 331a, 332a, and 333a, respectively. Accordingly, the vacuum produced in the engaging recess 311 through the passage 313 by operating the suction means can act through the plural through holes 331a, 332a, and 333a to the upper surface of the wafer holding member 32 having air permeability. The vibration generating means 33 is mounted through an insulating member on the shoulder portion 312 formed at the bottom of the engaging recess 311 of the body 31, and the wafer holding member 32 is located on the upper side of the vibration generating means 33.

As shown in FIGS. 1 and 2, the tape expanding means 4 includes supporting means 41 for supporting the annular frame holding member 21 so that the annular frame holding member 21 is movable in the vertical direction perpendicular to the holding surface of the wafer holding table 3. The supporting means 41 is composed of a plurality of air cylinders 411 provided on the supporting flange 314 formed at the lower end of the body 31 of the wafer holding table 3. Each air cylinder 411 is provided with a piston rod 412 connected to the lower surface of the annular frame holding member 21. The supporting means 41 composed of these plural air cylinders 411 functions to vertically move the annular frame holding member 21 so as to selectively take a reference position where the mounting surface 211 is substantially equal in height to the upper surface of the wafer holding table 3 and an expansion position where the mounting surface 211 is lower in height than the upper surface of the wafer holding table 3 by a predetermined amount.

The operation of the wafer dividing apparatus 1 will now be described with reference to FIGS. 1 to 4C. As shown in FIG. 4A, the annular frame F supporting the wafer 10 (whose strength has already been reduced along the streets 101 as shown in FIG. 5) through the dicing tape T is mounted on the mounting surface 211 of the frame holding member 21 of the frame holding means 2 and fixed to the frame holding member 21 by the clamp mechanisms 22 (frame holding step). At this time, the frame holding member 21 is set at the reference position shown in FIG. 4A.

Figure 4A:
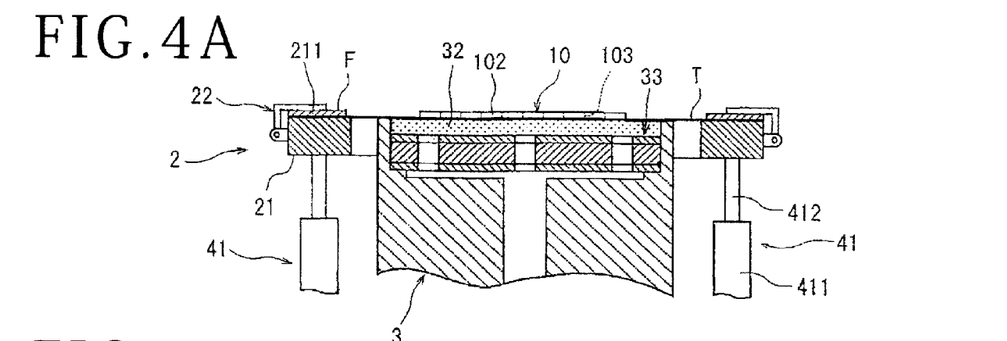
FIG. 4A is a sectional view showing a frame holding step performed by using the wafer dividing apparatus shown in FIG. 1.
Figure 4B:
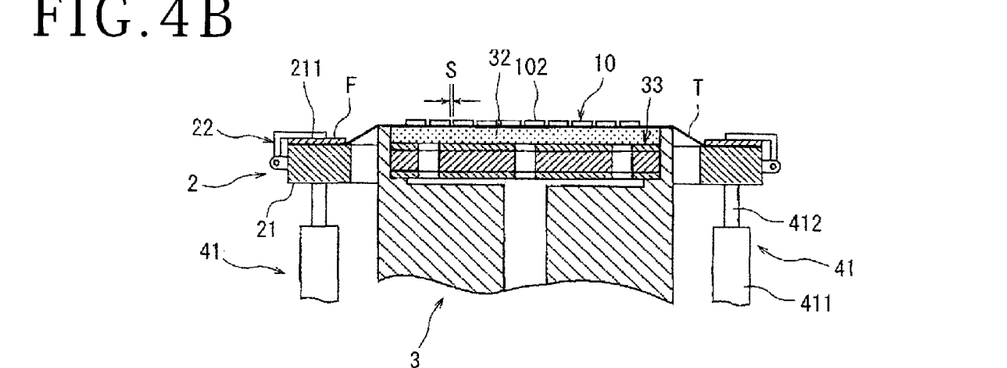
FIG. 4B is a sectional view showing a tape expanding step and a wafer dividing step subsequent to the frame holding step shown in FIG. 4A.

After performing the frame holding step mentioned above, the air cylinders 411 as the supporting means 41 of the tape expanding means 4 are operated to lower the frame holding member 21 to the expansion position shown in FIG. 4B. As a result, the annular frame F fixed to the mounting surface 211 of the frame holding member 21 is also lowered, so that the dicing tape T supported to the annular frame F comes into abutment against the upper edge of the wafer holding table 3 and is expanded as shown in FIG. 4B (tape expanding step). In this condition, the wafer 10 is mounted through the dicing tape T on the wafer holding member 32 of the wafer holding table 3.

In performing the tape expanding step mentioned above, AC power having a frequency of 100 Hz, for example, is applied between the electrode plates 332 and 333 of the vibration generating means 33 from the AC power supplying means 336 shown in FIG. 2. As a result, the vibrator 331 vibrates at the frequency of 100 Hz to thereby vibrate the wafer holding member 32 of the wafer holding table 3. Accordingly, the vibration of the wafer holding member 32 is transmitted to the wafer 10 mounted through the dicing tape T on the wafer holding member 32, so that the wafer 10 is divided into the individual devices 102 along the streets 101 where the strength of the wafer 10 is reduced by the formation of the modified layers 103, thereby forming a spacing S between any adjacent ones of the individual devices 102 as shown in FIG. 4B (wafer dividing step). In this manner, the wafer holding member 32 of the wafer holding table 3 is vibrated in the condition where the dicing tape T supported to the annular frame F is expanded, thereby applying vibration to the wafer 10 mounted through the dicing tape T on the wafer holding member 32 to divide the wafer 10 into the individual devices 102 along the streets 101 where the strength of the wafer 10 is reduced. Accordingly, the wafer 10 can be divided along the streets 101 accurately, reliably, and efficiently.

Figure 4C:
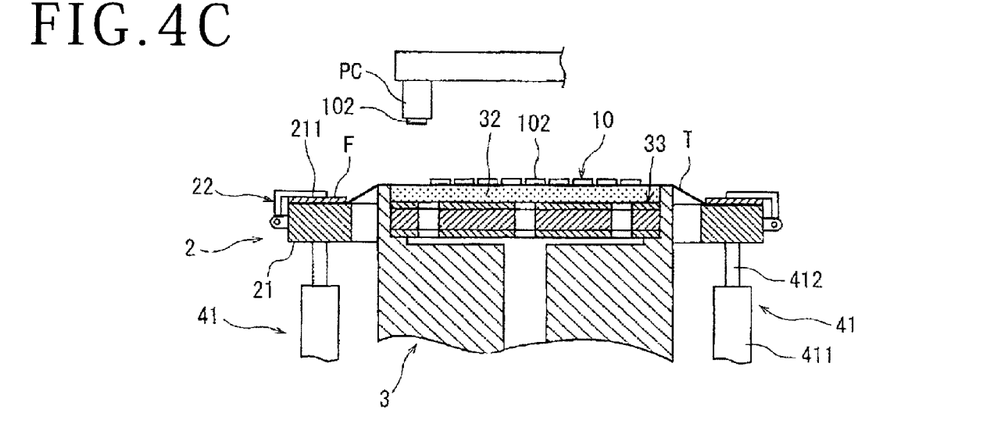
FIG. 4C is a sectional view showing a pickup step subsequent to the tape expanding step and the wafer dividing step shown in FIG. 4B.

After performing the wafer dividing step mentioned above, a pickup collet PC of a pickup apparatus is operated to hold the upper surface of each device 102 under suction and peel it off from the dicing tape T as shown in FIG. 4C (pickup step). At this time, the suction means connected to the wafer holding table 3 is operated to produce a vacuum on the upper surface of the wafer holding table 3, thereby sucking the dicing tape T to which the individual devices 102 divided from each other are attached. In the pickup step, the spacing S has already been formed between any adjacent ones of the individual devices 102, so that each device 102 can be easily picked up without the contact with its adjacent device 102.

There will now be described a laser processing apparatus 5 including the wafer dividing apparatus 1 mentioned above with reference to FIG. 6. The laser processing apparatus 5 shown in FIG. 6 includes a stationary base 50, a holding table mechanism 6 for holding a workpiece, the holding table mechanism 6 being provided on the stationary base 50 so as to be movable in a feeding direction (X direction) shown by an arrow X, a laser beam applying unit supporting mechanism 7 provided on the stationary base 50 so as to be movable in an indexing direction (Y direction) shown by an arrow Y perpendicular to the X direction, and a laser beam applying unit 8 provided on the laser beam applying unit supporting mechanism 7 so as to be movable in a focal position adjusting direction (Z direction) shown by an arrow Z.

The holding table mechanism 6 includes a pair of guide rails 61 provided on the stationary base 50 so as to extend parallel to each other in the X direction, a first slide block 62 provided on the guide rails 61 so as to be movable in the X direction, a second slide block 63 provided on the first slide block 62 so as to be movable in the Y direction, and wafer holding means 60 provided on the second slide block 63. The wafer holding means 60 is substantially the same in configuration as the wafer dividing apparatus 1 shown in FIGS. 1 to 3, so the description of the wafer holding means 60 will be omitted herein. The wafer holding means 60 provided on the second slide block 63 is rotatable by a rotationally driving mechanism (not shown).

Figure 6:
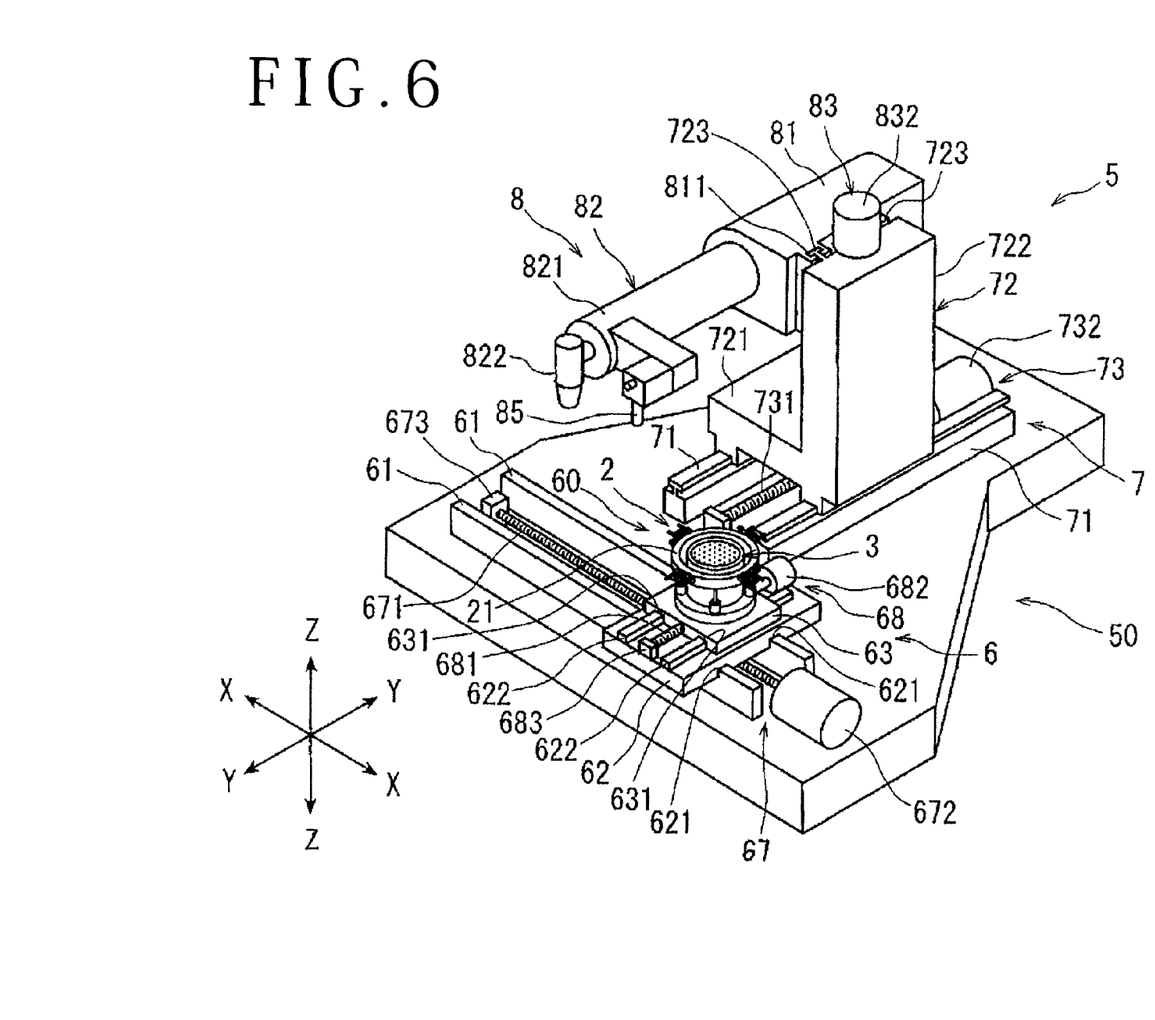
FIG. 6 is a perspective view of a laser processing apparatus according to the present invention.

The lower surface of the first slide block 62 is formed with a pair of guided grooves 621 for slidably engaging the pair of guide rails 61 mentioned above. A pair of guide rails 622 are provided on the upper surface of the first slide block 62 so as to extend parallel to each other in the Y direction. Accordingly, the first slide block 62 is movable in the X direction along the guide rails 61 by the slidable engagement of the guided grooves 621 with the guide rails 61. The holding table mechanism 6 further includes feeding means 67 provided by a ball screw mechanism for moving the first slide block 62 in the X direction along the guide rails 61.

The feeding means 67 includes an externally threaded rod 671 extending parallel to the guide rails 61 so as to be interposed therebetween and a pulse motor 672 as a drive source for rotationally driving the externally threaded rod 671. The externally threaded rod 671 is rotatably supported at one end thereof to a bearing block 673 fixed to the stationary base 50 and is connected at the other end to the output shaft of the pulse motor 672 so as to receive the torque thereof. The externally threaded rod 671 is engaged with a tapped through hole formed in an internally threaded block (not shown) projecting from the lower surface of the first slide block 62 at a central portion thereof. Accordingly, the first slide block 62 is moved in the X direction along the guide rails 61 by operating the pulse motor 672 to normally or reversely rotate the externally threaded rod 671.

The lower surface of the second slide block 63 is formed with a pair of guided grooves 631 for slidably engaging the pair of guide rails 622 provided on the upper surface of the first slide block 62 as mentioned above. Accordingly, the second slide block 63 is movable in the Y direction along the guide rails 622 by the slidable engagement of the guided grooves 631 with the guide rails 622. The holding table mechanism 6 further includes first indexing means 68 provided by a ball screw mechanism for moving the second slide block 63 in the Y direction along the guide rails 622. The first indexing means 68 includes an externally threaded rod 681 extending parallel to the guide rails 622 so as to be interposed therebetween and a pulse motor 682 as a drive source for rotationally driving the externally threaded rod 681.

The externally threaded rod 681 is rotatably supported at one end thereof to a bearing block 683 fixed to the upper surface of the first slide block 62 and is connected at the other end to the output shaft of the pulse motor 682 so as to receive the torque thereof. The externally threaded rod 681 is engaged with a tapped through hole formed in an internally threaded block (not shown) projecting from the lower surface of the second slide block 63 at a central portion thereof. Accordingly, the second slide block 63 is moved in the Y direction along the guide rails 622 by operating the pulse motor 682 to normally or reversely rotate the externally threaded rod 681.

The laser beam applying unit supporting mechanism 7 includes a pair of guide rails 71 provided on the stationary base 50 so as to extend parallel to each other in the Y direction and a movable support base 72 provided on the guide rails 71 so as to be movable in the Y direction. The movable support base 72 is composed of a horizontal portion 721 slidably supported to the guide rails 71 and a vertical portion 722 extending vertically upward from the upper surface of the horizontal portion 721. Further, a pair of guide rails 723 are provided on one side surface of the vertical portion 722 so as to extend parallel to each other in the Z direction. The laser beam applying unit supporting mechanism 7 further includes second indexing means 73 provided by a ball screw mechanism for moving the movable support base 72 in the Y direction along the guide rails 71.

The second indexing means 73 includes an externally threaded rod 731 extending parallel to the guide rails 71 so as to be interposed therebetween and a pulse motor 732 as a drive source for rotationally driving the externally threaded rod 731. The externally threaded rod 731 is rotatably supported at one end thereof to a bearing block (not shown) fixed to the stationary base 50 and is connected at the other end to the output shaft of the pulse motor 732 so as to receive the torque thereof. The externally threaded rod 731 is engaged with a tapped through hole formed in an internally threaded block (not shown) projecting from the lower surface of the horizontal portion 721 at a central portion thereof. Accordingly, the movable support base 72 is moved in the Y direction along the guide rails 71 by operating the pulse motor 732 to normally or reversely rotate the externally threaded rod 731.

The laser beam applying unit 8 includes a unit holder 81 and laser beam applying means 82 mounted on the unit holder 81. The unit holder 81 is formed with a pair of guided grooves 811 for slidably engaging the pair of guide rails 723 provided on the vertical portion 722 of the movable support base 72. Accordingly, the unit holder 81 is supported to the movable support base 72 so as to be movable in the Z direction by the slidable engagement of the guided grooves 811 with the guide rails 723.

The laser beam applying unit 8 includes focal position adjusting means 83 for moving the unit holder 81 along the guide rails 723 in the Z direction perpendicular to the holding surface of the wafer holding table 3. Like the feeding means 67, the first indexing means 68, and the second indexing means 73, the focal position adjusting means 83 is provided by a ball screw mechanism. That is, the focal position adjusting means 83 includes an externally threaded rod (not shown) extending parallel to the guide rails 723 so as to be interposed therebetween and a pulse motor 832 as a drive source for rotationally driving this externally threaded rod. Accordingly, the unit holder 81 and the laser beam applying means 82 are moved in the Z direction along the guide rails 723 by operating the pulse motor 832 to normally or reversely rotate this externally threaded rod. In this preferred embodiment, when the pulse motor 832 is normally operated, the laser beam applying means 82 is moved upward, whereas when the pulse motor 832 is reversely operated, the laser beam applying means 82 is moved downward.

The laser beam applying means 82 includes a cylindrical casing 821 extending in a substantially horizontal direction. The casing 821 contains pulsed laser beam oscillating means. The laser beam applying means 82 further includes focusing means 822 mounted on the front end of the casing 821 for focusing a pulsed laser beam oscillated from the pulsed laser beam oscillating means toward a workpiece held on the wafer holding table 3 of the wafer holding means 60. The pulsed laser beam oscillating means oscillates a pulsed laser beam having a transmission wavelength (e.g., 1064 nm) to a wafer as the workpiece. Imaging means 85 is mounted on the front end portion of the casing 821 of the laser beam applying means 82. The imaging means 85 functions to detect a subject area of the workpiece to be laser-processed by the laser beam applying means 82. The imaging means 85 includes illuminating means for illuminating the workpiece, an optical system for capturing an area illuminated by the illuminating means, and an imaging device (CCD) for detecting an image corresponding to the area captured by the optical system. An image signal output from the imaging means 85 is transmitted to control means (not shown).

Figure 7:
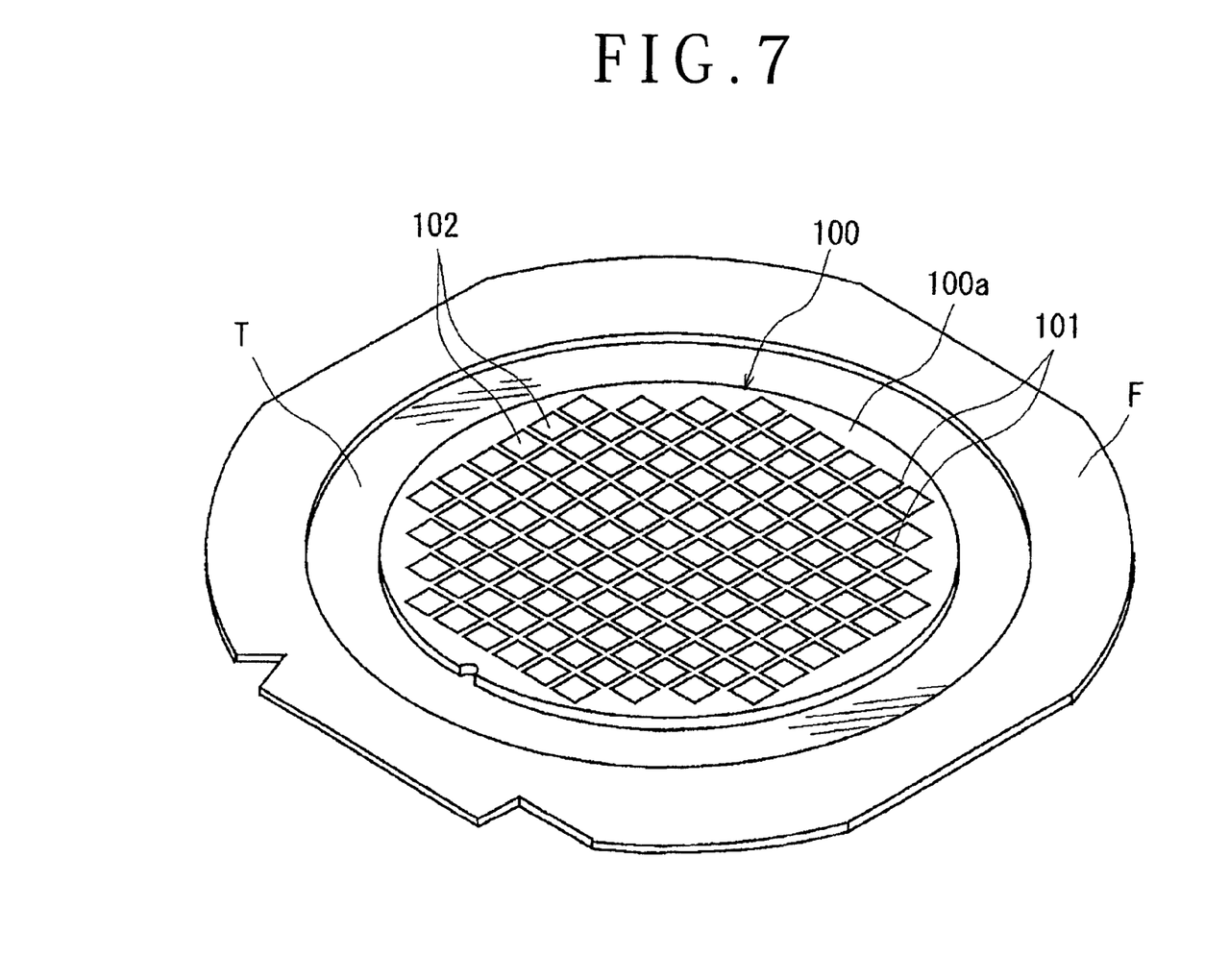
FIG. 7 is a perspective view of a wafer attached to a dicing tape supported to an annular frame in the condition where the wafer is subjected to laser processing by the laser processing apparatus shown in FIG. 6.

The operation of the laser processing apparatus 5 will now be described. FIG. 7 shows a wafer 100 attached to the upper surface of a dicing tape T supported to an annular frame F. The wafer 100 has a front side 100*a*, and a plurality of crossing streets 101 are formed on the front side 100*a* of the wafer 100 to thereby partition a plurality of rectangular regions where a plurality of devices 102 are respectively formed. This wafer 100 is different from the wafer 10 shown in FIG. 5 in the point that the modified layer 103 as a break start point is not formed inside the wafer 100 along each street 101. There will now be described a laser processing operation for forming the modified layer 103 inside the wafer 100 along each street 101 by using the laser processing apparatus 5.

First, the annular frame F supporting the wafer 100 through the dicing tape T as shown in FIG. 7 is mounted on the mounting surface 211 of the frame holding member 21 of the frame holding means 2 in the laser processing apparatus 5 shown in FIG. 6. Further, the annular frame F is fixed to the frame holding member 21 by the clamp mechanisms 22 as shown in FIG. 4A (frame holding step). At this time, the frame holding member 21 is set at the reference position where the mounting surface 211 is substantially equal in height to the upper surface of the wafer holding table 3. Accordingly, the wafer 100 is placed on the wafer holding table 3 in the condition where the dicing tape T comes into contact with the upper surface of the wafer holding table 3. Thereafter, the suction means connected to the wafer holding table 3 is operated to produce a vacuum on the upper surface of the wafer holding table 3, thereby holding the wafer 100 through the dicing tape T on the wafer holding table 3 under suction (wafer holding step).

After performing the wafer holding step mentioned above, the feeding means 67 is operated to move the wafer holding table 3 holding the wafer 100 to a position directly below the imaging means 85. In the condition where the wafer holding table 3 is positioned directly below the imaging means 85, an alignment operation is performed by the imaging means 85 and the control means to detect a subject area of the wafer 100 to be laser-processed. More specifically, the imaging means 85 and the control means perform image processing such as pattern matching for making the alignment of the streets 101 extending in a first direction on the wafer 100 and the focusing means 822 of the laser beam applying means 82 for applying the laser beam along the streets 101, thus performing the alignment of a laser beam applying position (alignment step). This alignment operation is performed similarly for the other streets 101 extending in a second direction perpendicular to the first direction mentioned above on the wafer 100.

Figure 8A:
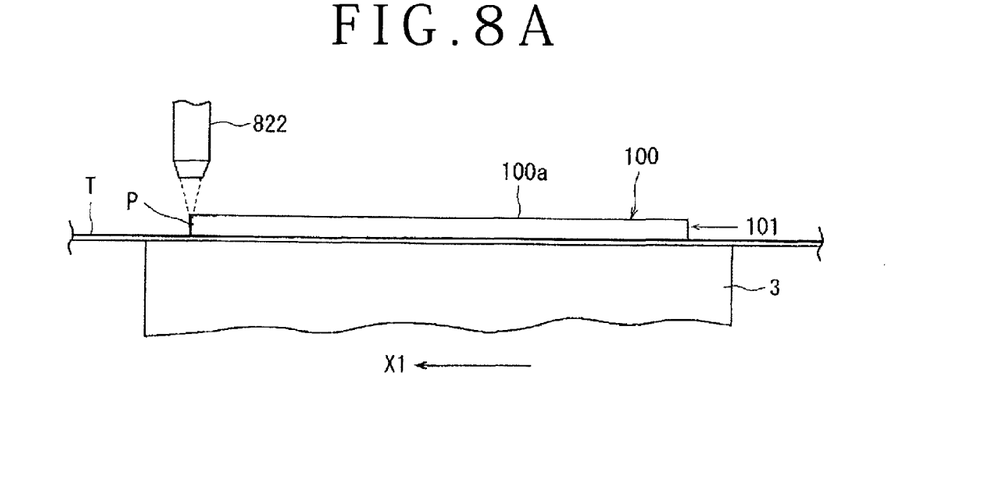
FIGS. 8A and 8B are sectional side views for illustrating a modified layer forming step of forming a modified layer along each street in the wafer shown FIG. 7 by using the laser processing apparatus shown in FIG. 6.
Figure 8B:
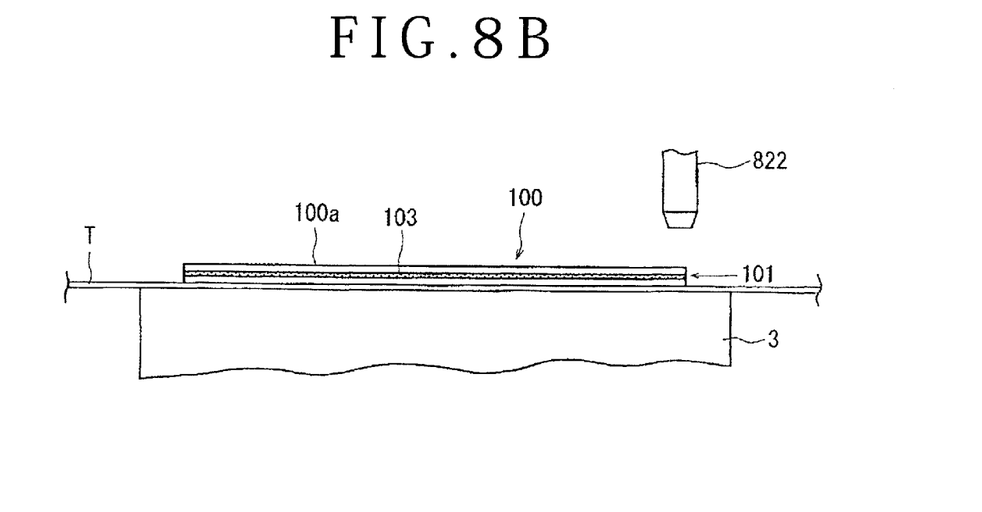

After performing the alignment step, a modified layer forming step of forming a modified layer inside the wafer 100 along each street 101 is performed in the following manner. First, as shown in FIG. 8A, the wafer holding table 3 is moved to position one end (left end as viewed in FIG. 8A) of a predetermined one of the streets 101 extending in the first direction directly below the focusing means 822. Thereafter, the laser beam applying means 82 is operated to apply a pulsed laser beam having a transmission wavelength to the wafer 100 from the focusing means 822 to the wafer 100, and the wafer holding table 3 is moved in a direction shown by an arrow X1 in FIG. 8A at a predetermined feed speed. When the other end (right end as viewed in FIG. 8B) of the predetermined street 101 reaches the position directly below the focusing means 822 as shown in FIG. 8B, the application of the pulsed laser beam is stopped and the movement of the wafer holding table 3 is also stopped. In this modified layer forming step, the focal point P of the pulsed laser beam is set at the middle of the thickness of the wafer 100 as shown in FIG. 8A. As a result, a modified layer 103 is formed in the wafer 100 at the middle of the thickness thereof along the predetermined street 101 as shown in FIG. 8B.

For example, the modified layer forming step mentioned above is performed under the following processing conditions.

Light source: LD pumped Q-switched Nd:YVO4 pulsed laser
Wavelength: 1064 nm
Repetition frequency: 80 kHz
Average power: 2 W
Focused spot diameter: ϕ1 μm
Work feed speed: 300 mm/second After performing the modified layer forming step along all of the streets 101 extending in the first direction, the wafer holding table 3 is rotated 90° to similarly perform the modified layer forming step along all of the other streets 101 extending in the second direction perpendicular to the first direction. In this manner, the modified layer forming step is performed along all of the streets 101 extending in the first and second directions on the wafer 100 to thereby form the modified layers 103 inside the wafer 100 along all of the streets 101. Accordingly, the wafer 100 processed by the modified layer forming step mentioned above is similar to the wafer 10 shown in FIG. 5.

After performing the modified layer forming step along all of the streets 101 extending in the first and second directions on the wafer 100 to form the modified layers 103 inside the wafer 100 along all of the streets 101, the wafer holding table 3 holding the wafer 100 is returned to the initial position, and the suction holding of the wafer 100 is canceled at this position. Thereafter, the tape expanding step and the wafer dividing step are performed as shown in FIG. 4B to thereby divide the wafer 100 into the individual devices 102 along all of the streets 101 where the modified layers 103 are formed. Accordingly, the wafer 100 can be divided along all of the streets 101 accurately, reliably, and efficiently.

Figure 3:
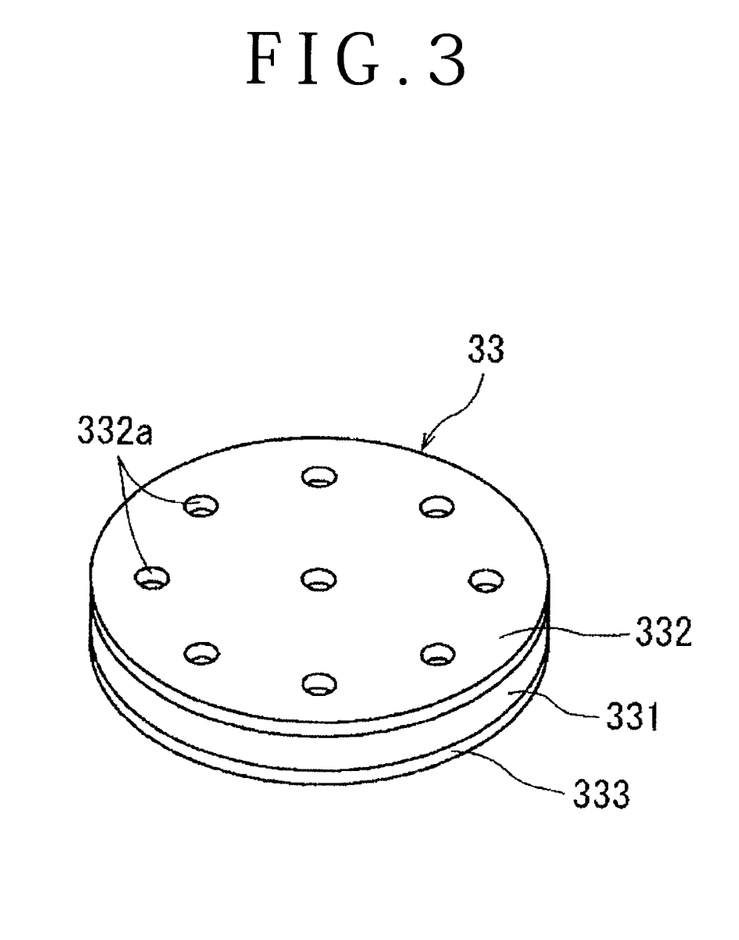
FIG. 3 is a perspective view of vibration generating means constituting the wafer dividing apparatus shown in FIG. 1.

As described above, the wafer holding means 60 in the laser processing apparatus 5 shown in FIG. 6 is substantially the same in configuration as the wafer dividing apparatus 1 shown in FIGS. 1 to 3. Accordingly, the modified layer forming step of forming the modified layers 103 in the wafer 100 along the plural streets 101 and the wafer dividing step of dividing the wafer 100 into the individual devices 102 along the plural streets 101 where the modified layers 103 are formed as applying vibration to the wafer 100 can be performed in the condition where the wafer 100 is held by the wafer holding means 60 in the laser processing apparatus 5.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A wafer dividing apparatus for dividing a wafer along a plurality of crossing streets in the condition where said wafer is attached to the upper surface of a dicing tape supported to an annular frame and the strength of said wafer is reduced along said streets, said wafer dividing apparatus, comprising:
   frame holding means for holding said annular frame;
   a wafer holding table having a holding surface for holding said wafer through said dicing tape supported to said annular frame held by said frame holding means;
   tape expanding means for relatively moving said frame holding means and said wafer holding table in a direction perpendicular to said holding surface of said wafer holding table to thereby expand said dicing tape;
   a vibration generating mechanism that includes a vibrator sandwiched between a pair of electrode plates, wherein said vibration generating mechanism applies vibration to said holding surface of said wafer holding table when electric current is applied between said electrode plates; and
   a suction means for producing a vacuum for maintaining the wafer upon said holding surface of said wafer holding table;
   wherein said electrode plates each include a plurality of aligned through holes for allowing suction from said suction means to pass through said vibration generating mechanism.

2. The wafer dividing apparatus according to claim 1, wherein said vibrator is comprised of a piezoelectric ceramic material, and said electrode plates are mounted on opposite polarized surfaces of said vibrator.

3. The wafer dividing apparatus according to claim 2, wherein said piezoelectric ceramic material is selected from one of the following materials: barium titanate, lead titanate zirconate, and lithium tantalite.

4. The wafer dividing apparatus according to claim 1, wherein said electrode plates are each generally circular in shape.

5. The wafer dividing apparatus according to claim 1, wherein the vibrator is configured and arranged to vibrate at a frequency of approximately 100 Hz.

6. A laser processing apparatus, comprising:
wafer holding means for holding a wafer attached to the upper surface of a dicing tape supported to an annular frame;
laser beam applying means for applying a laser beam to said wafer held by said wafer holding means;
feeding means for relatively moving said wafer holding means and said laser beam applying means in a feeding direction; and
indexing means for relatively moving said wafer holding means and said laser beam applying means in an indexing direction perpendicular to said feeding direction;
said wafer holding means including:
frame holding means for holding said annular frame,
a wafer holding table having a holding surface for holding said wafer through said dicing tape supported to said annular frame held by said frame holding means,
tape expanding means for relatively moving said frame holding means and said wafer holding table in a direction perpendicular to said holding surface of said wafer holding table to thereby expand said dicing tape,
a vibration generating mechanism that includes a vibrator sandwiched between a pair of electrode plates, wherein said vibration generating mechanism applies vibration to said holding surface of said wafer holding table when electric current is applied between said electrode plates, and
a suction means for producing a vacuum for maintaining the wafer upon said holding surface of said wafer holding table,
wherein said electrode plates each include a plurality of aligned through holes for allowing suction from said suction means to pass through said vibration generating mechanism.

7. The laser processing apparatus according to claim 6, wherein said vibrator is comprised of a piezoelectric ceramic material, and said electrode plates are mounted on opposite polarized surfaces of said vibrator.

8. The laser processing apparatus according to claim 7, wherein said piezoelectric ceramic material is selected from one of the following materials: barium titanate, lead titanate zirconate, and lithium tantalite.

9. The laser processing apparatus according to claim 6, wherein said electrode plates are each generally circular in shape.

10. The laser processing apparatus according to claim 6, wherein the vibrator is configured and arranged to vibrate at a frequency of approximately 100 Hz.

\* \* \* \* \*